United States Patent
Lee et al.

(10) Patent No.: US 10,431,790 B2
(45) Date of Patent: Oct. 1, 2019

(54) BATTERY MODULE HAVING ELECTRODE LEAD WITH DAMPING STRUCTURE

(71) Applicant: LG CHEM, LTD., Seoul (KR)

(72) Inventors: Bum Hyun Lee, Daejeon (KR); Jin-Kyu Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 199 days.

(21) Appl. No.: 15/022,881

(22) PCT Filed: Sep. 25, 2014

(86) PCT No.: PCT/KR2014/008926
§ 371 (c)(1),
(2) Date: Mar. 17, 2016

(87) PCT Pub. No.: WO2015/046898
PCT Pub. Date: Apr. 2, 2015

(65) Prior Publication Data
US 2016/0226043 A1   Aug. 4, 2016

(30) Foreign Application Priority Data
Sep. 25, 2013   (KR) ......................... 10-2013-0113626

(51) Int. Cl.
*H01M 2/10*   (2006.01)
*H01M 2/02*   (2006.01)
(Continued)

(52) U.S. Cl.
CPC ......... *H01M 2/1094* (2013.01); *H01M 2/021* (2013.01); *H01M 2/0212* (2013.01);
(Continued)

(58) Field of Classification Search
None
See application file for complete search history.

(56) References Cited

U.S. PATENT DOCUMENTS

| | | | |
|---|---|---|---|
| 2003/0224246 A1* | 12/2003 | Watanabe | H01M 2/0207 429/159 |
| 2012/0183840 A1* | 7/2012 | Lee | H01M 2/1077 429/158 |

(Continued)

FOREIGN PATENT DOCUMENTS

| | | | | |
|---|---|---|---|---|
| JP | 2011-113929 A | | 6/2011 | |
| JP | 2011113929 A | * | 6/2011 | ............. H01G 11/00 |

(Continued)

OTHER PUBLICATIONS

International Search Report for PCT/KR2014/008926 dated Dec. 19, 2014.

*Primary Examiner* — Barbara L Gilliam
*Assistant Examiner* — Angela J Martin
(74) *Attorney, Agent, or Firm* — Birch, Stewart, Kolasch & Birch, LLP

(57) ABSTRACT

Disclosed herein is a battery module including two or more battery cells, which can be charged and discharged, stacked in a state of being adjacent to each other in a vertical direction or in a horizontal direction, and sheathing members for respectively fixing the battery cells to form a battery cell stack, wherein each of the battery cells has electrode leads electrically connected to an electrode assembly, which is mounted in a battery cell case of each of the battery cells, in a state of protruding outward from the battery cell case, the electrode leads of the battery cells of the battery cell stack are coupled to each other by welding to form a coupled portion of the electrode leads, and the coupled portion of the electrode leads or the remaining portion of the electrode leads excluding the coupled portion of the electrode leads is provided with a damping structure for absorbing or buffering external force applied to the battery module or vibration generated during welding.

20 Claims, 6 Drawing Sheets

(51) Int. Cl.
*H01M 2/20* (2006.01)
*H01M 2/26* (2006.01)
*H01M 2/30* (2006.01)

(52) U.S. Cl.
CPC ......... *H01M 2/1077* (2013.01); *H01M 2/206* (2013.01); *H01M 2/26* (2013.01); *H01M 2/305* (2013.01); *H01M 2220/20* (2013.01)

(56) References Cited

U.S. PATENT DOCUMENTS

2013/0330595 A1    12/2013   Lee et al.
2014/0120406 A1    5/2014   Kim

FOREIGN PATENT DOCUMENTS

| KR | 10-2012-0040447 A | | 4/2012 | |
| --- | --- | --- | --- | --- |
| KR | 20120040447 | * | 4/2012 | ............ H01M 2/02 |
| KR | 10-2012-0074425 A | | 7/2012 | |
| KR | 10-2012-0082145 A | | 7/2012 | |
| KR | 10-2012-0088122 A | | 8/2012 | |
| KR | 20120088122 | * | 8/2012 | ............ H01M 2/34 |
| WO | WO 2005/074054 A1 | | 8/2005 | |
| WO | WO 2012/148100 | * | 11/2012 | ............ H01M 2/10 |
| WO | WO 2012/148100 A2 | | 11/2012 | |
| WO | WO 2013/009042 A2 | | 1/2013 | |

* cited by examiner

[FIG. 1]
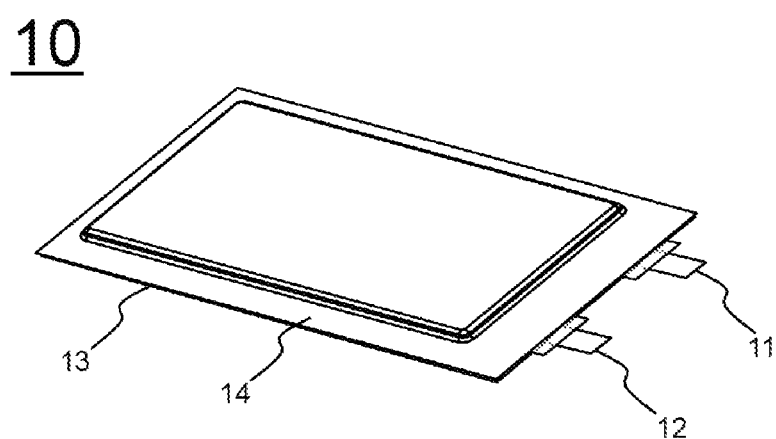

[FIG. 2]
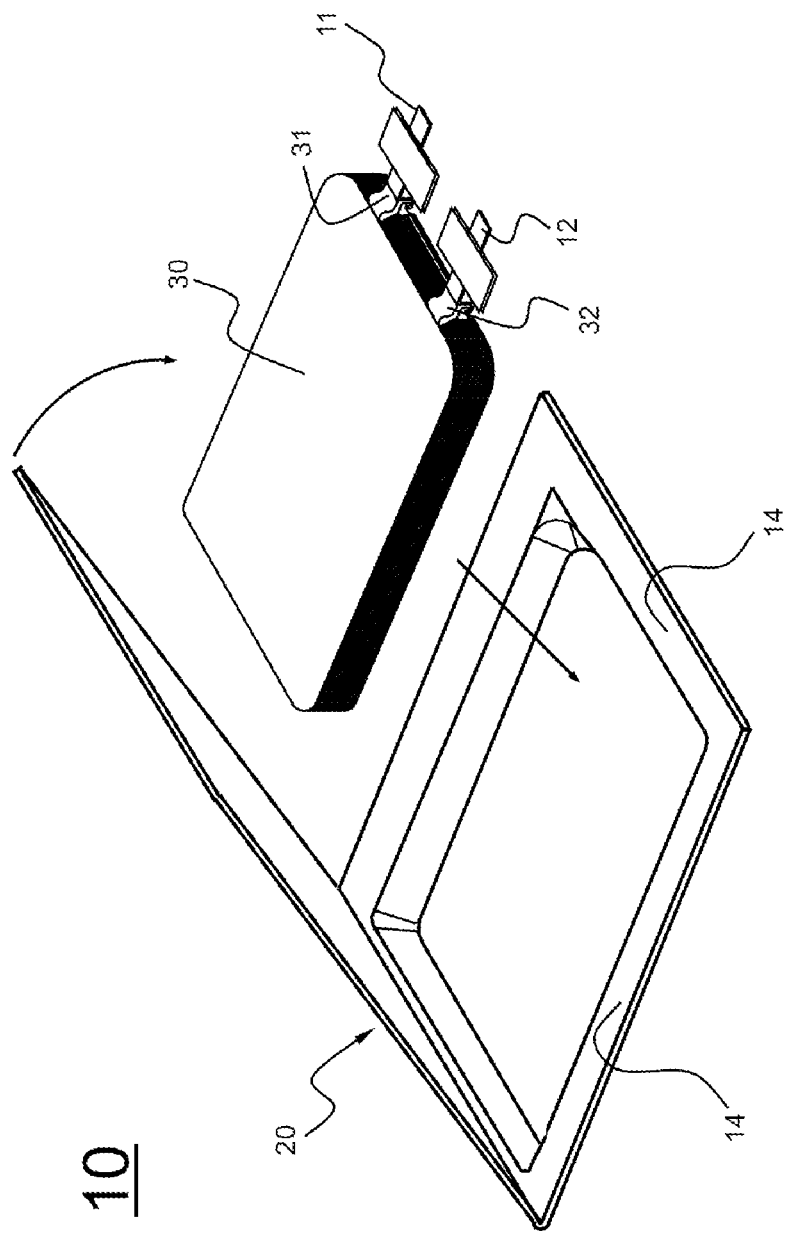

【FIG. 3】
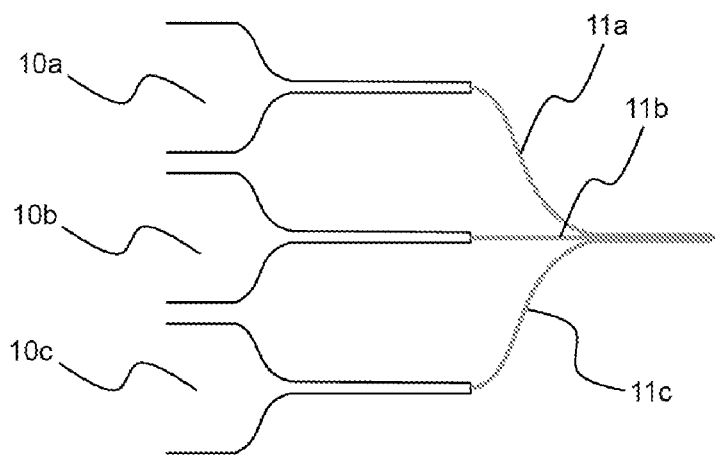
【FIG. 4】
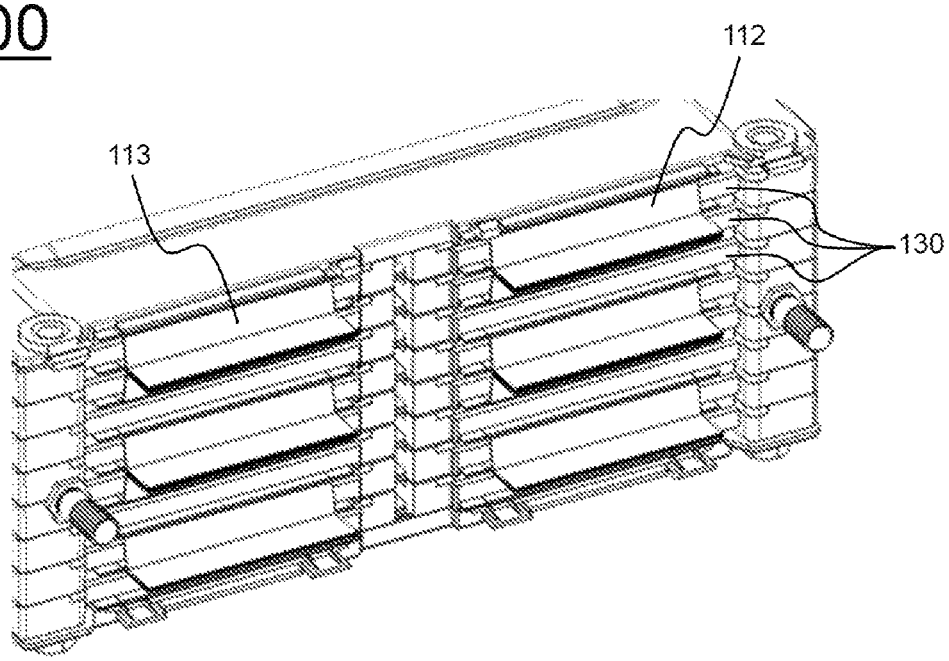

[FIG. 5]
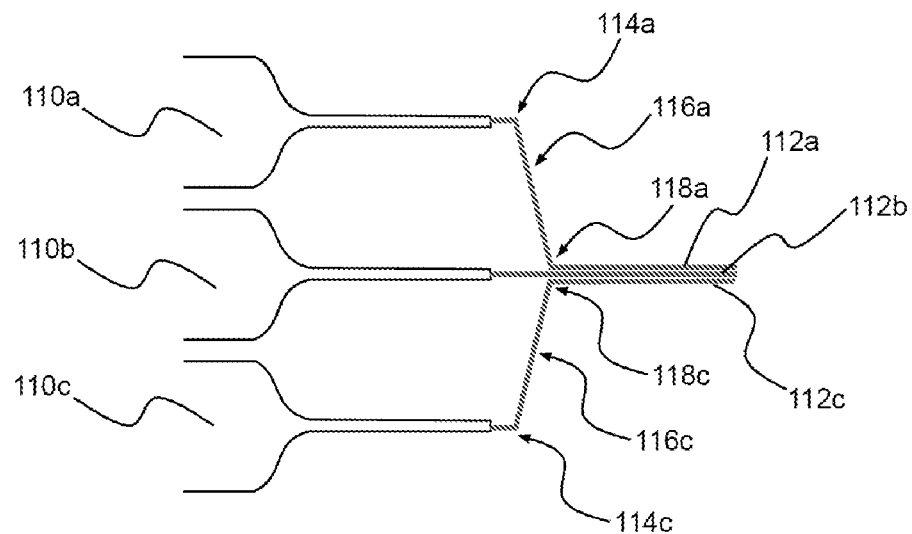
[FIG. 6]
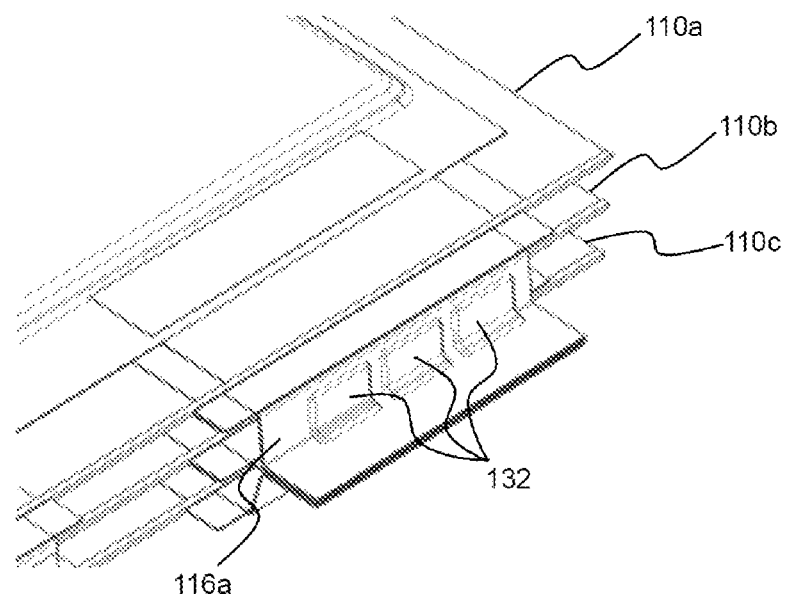

【FIG. 7】
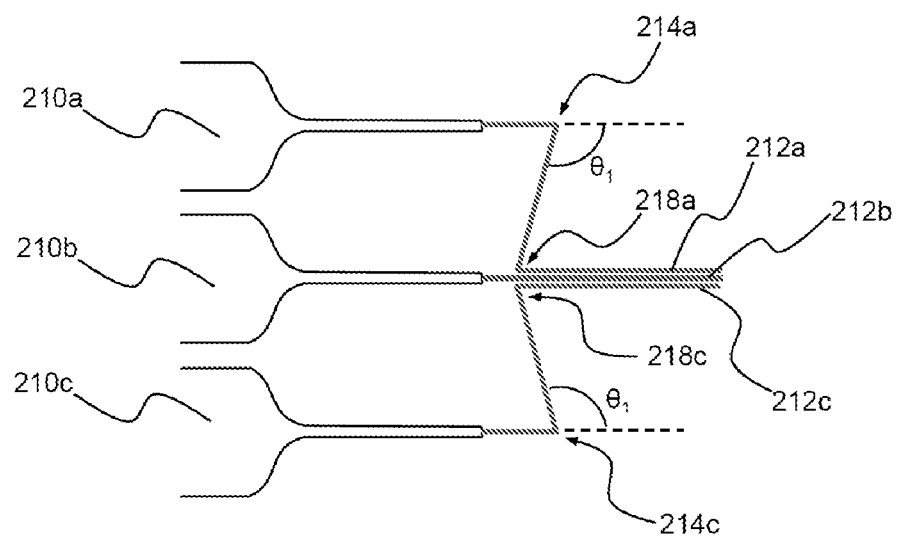
【FIG. 8】
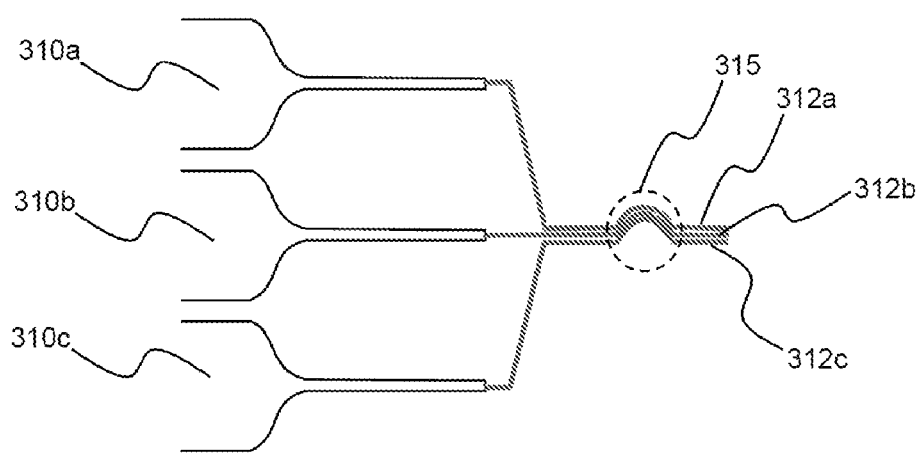

[FIG. 9]
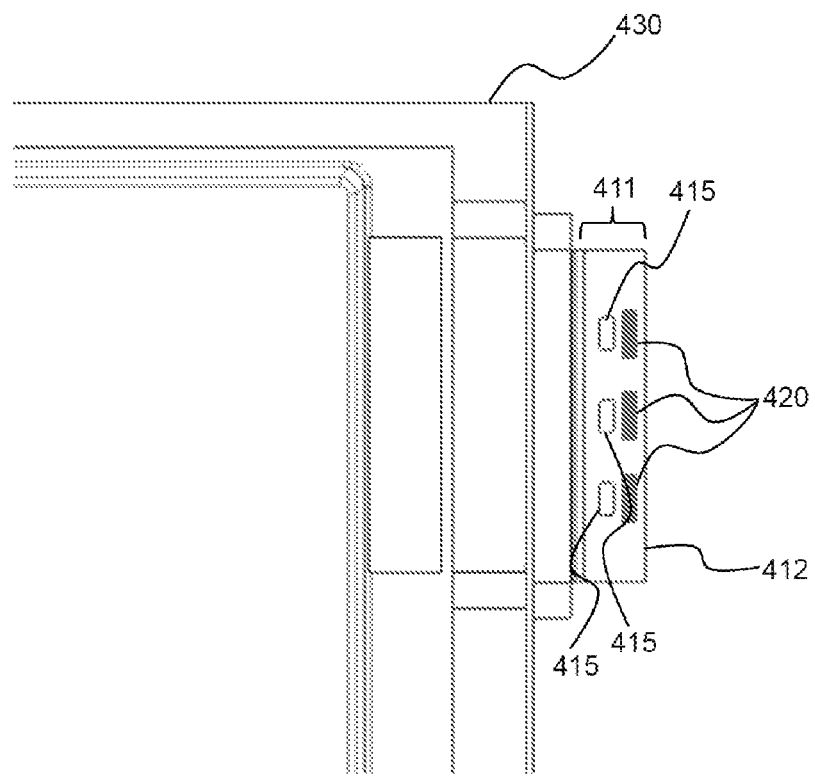

BATTERY MODULE HAVING ELECTRODE LEAD WITH DAMPING STRUCTURE

TECHNICAL FIELD

The present invention relates to a battery module including electrode leads at which a structure for damping external impact and vibration is formed.

BACKGROUND ART

In recent years, a secondary battery, which can be charged and discharged, has been widely used as an energy source for wireless mobile devices. In addition, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

Small-sized mobile devices use one or several battery cells for each device. On the other hand, middle or large-sized devices, such as vehicles, use a battery module having a plurality of battery cells electrically connected to each other because high output and large capacity are necessary for the middle or large-sized devices.

Preferably, the battery module is manufactured so as to have as small a size and weight as possible. For this reason, a prismatic battery or a pouch-shaped battery, which can be stacked with high integration and has a small weight to capacity ratio, is usually used as a battery cell (a unit cell) of the battery module. In particular, much interest is currently focused on the pouch-shaped battery, which uses an aluminum laminate sheet as a sheathing member, because the pouch-shaped battery is lightweight, the manufacturing cost of the pouch-shaped battery is low, and it is easy to modify the shape of the pouch-shaped battery.

FIG. 1 is a perspective view showing a pouch-shaped battery cell, which is included in a conventional battery module, and FIG. 2 is an exploded perspective view of FIG. 1.

Referring to FIGS. 1 and 2, the pouch-shaped battery cell is a plate-shaped battery cell 10 having electrode leads (a positive electrode lead 11 and a negative electrode lead 12) formed at one end thereof. The pouch-shaped battery cell is configured to have a structure in which an electrode assembly 30, including positive electrodes, negative electrodes, and separators respectively disposed between the positive electrodes and the negative electrodes, is mounted in a pouch-shaped battery cell case 20 in a state of being sealed by a sealed portion formed by thermal bonding such that two electrode leads 11 and 12, welded to positive electrode and negative electrode tabs 31 and 32 of the electrode assembly 30 such that the electrode leads 11 and 12 are electrically connected to the positive electrode and negative electrode tabs 31 and 32, are exposed outward from the pouch-shaped battery cell case 20.

FIG. 3 is a typical view showing a structure in which pouch-shaped battery cells are electrically connected to one another.

Referring to FIG. 3 together with FIG. 2, electrode leads 11a, 11b, and 11c of three adjacent pouch-shaped battery cells 10a, 10b, and 10c are coupled to one another such that the electrode leads 11a, 11b, and 11c are electrically connected to one another. The electrode leads 11a and 11c of the battery cells 10a and 10c, which protrude outward from battery cell cases of the battery cells 10a and 10c, are bent such that the electrode leads 11a and 11c are connected to the electrode lead 11b of the battery cell 10b adjacent thereto. The electrode leads 11a, 11b, and 11c are electrically and physically coupled to one another by ultrasonic welding performed in a state in which the electrode leads 11a, 11b, and 11c overlap with each other.

When ultrasonic welding is performed using high energy, strength of welded portion between the electrode tabs 31 and 32 and the electrode leads 11 and 12 is reduced due to vibration generated during ultrasonic welding with the result that the electrode tabs 31 and 32 and the electrode leads 11 and 12 of the battery cell 10 may be broken or short-circuited. Besides, the vibration generated during ultrasonic welding may be transferred to other portions of the battery cell 10 with the result that the battery cell 10 may be electrically damaged.

In addition, when a battery module is assembled or when the battery module is mounted in a device, the coupled portions between the electrode tabs and the electrode leads may be damaged due to external force with the result that the safety of the battery module may be reduced. For example, when the battery module is transported or when the battery module is mounted in a device, such as an electric vehicle, the coupled portions between the electrode tabs and the electrode leads may be damaged due to external force or vibration applied to the battery module.

Therefore, there is a high necessity for a battery cell that is capable of preventing the breakage of, short circuit of, or damage to a coupled portion of electrode leads due to external force or vibration generated during ultrasonic welding.

DISCLOSURE

Technical Problem

The present invention has been made to solve the above problems and other technical problems that have yet to be resolved.

It is an object of the present invention to provide a battery module that is capable of minimizing damage to coupled portions between electrode tabs and electrode leads due to external impact, external force, or vibration generated during assembly or welding of the battery module, thereby preventing the breakage or short circuit of the coupled portions between the electrode tabs and the electrode leads and thus improving the safety of the battery module.

Technical Solution

In accordance with one aspect of the present invention, the above and other objects can be accomplished by the provision of a battery module including two or more battery cells, which can be charged and discharged, stacked in a state of being adjacent to each other in a vertical direction or in a horizontal direction, and sheathing members for respectively fixing the battery cells to form a battery cell stack, wherein each of the battery cells has electrode leads electrically connected to an electrode assembly, which is mounted in a battery cell case of each of the battery cells, in a state of protruding outward from the battery cell case, the electrode leads of the battery cells of the battery cell stack are coupled to each other by welding to form a coupled portion of the electrode leads, and the coupled portion of the electrode leads or the remaining portion of the electrode leads excluding the coupled portion of the electrode leads is provided with a damping structure for absorbing or buffering external force applied to the battery module or vibration generated during welding.

That is, the battery module according to the present invention is configured such that vibration or external impact applied to the electrode leads is absorbed or dispersed by the damping structure, thereby preventing the breakage of, short circuit of, or damage to coupled portions between electrode tabs and the electrode leads and thus improving the safety of the battery module.

In the present invention, the coupled portion of the electrode leads means a portion at which the electrode leads of the battery cells are stacked such that the electrode leads are coupled in series or in parallel to each other. Welded portions are formed at the coupled portion of the electrode leads by ultrasonic welding such that the electrode leads are electrically and physically coupled to each other.

The position of the damping structure formed at the electrode leads is not particularly restricted. For example, the damping structure may be formed at a portion of the electrode leads protruding outward from the battery cell cases. Specifically, the damping structure may be formed at the coupled portion of the electrode leads. Alternatively, the damping structure may be formed at the remaining portion of the electrode leads excluding the coupled portion of the electrode leads.

Each of the battery cells may be a rectangular plate-shaped battery cell, which provides a high stacking rate in a limited space. Plate-shaped battery cells may be stacked such that one side of one of the plate-shaped battery cells faces another of the plate-shaped battery cells or such that opposite sides of one of the plate-shaped battery cells face others of the plate-shaped battery cells to form the battery cell stack.

For example, the plate-shaped battery cell may be a pouch-shaped battery cell configured to have a structure in which an electrode assembly is mounted in a battery case made of a laminate sheet including a resin layer and a metal layer.

Specifically, each of the battery cells may be a pouch-shaped battery cell configured to have a structure in which an electrode assembly of a positive electrode/separator/negative electrode structure is contained in a battery case together with an electrolyte in a sealed state. Each of the battery cells may be a plate-shaped battery cell configured to have an approximately rectangular hexahedral structure having a small thickness to width ratio. In general, the pouch-shaped battery cell may include a pouch-shaped battery case. The battery case is configured to have a laminate sheet structure in which an outer coating layer made of a polymer resin exhibiting high durability, a barrier layer made of a metal material blocking moisture or air, and an inner sealant layer made of a thermally bondable polymer resin are sequentially stacked.

The battery case of the pouch-shaped battery cell may be configured to have various structures. For example, the battery case of the pouch-shaped battery cell may be configured to have a structure in which an electrode assembly is received in a receiving part formed at an upper inner surface and/or a lower inner surface of a two-unit member, and the upper and lower contact regions of the outer edge of the battery case are sealed by thermal bonding. The pouch-shaped battery cell with the above-stated construction is disclosed in PCT International Application No. PCT/KR2004/003312, which has been filed in the name of the applicant of the present patent application. The disclosure of the above-mentioned patent application is hereby incorporated by reference as if fully set forth herein. Alternatively, the battery case may be configured to have a structure in which an electrode assembly is received in a receiving part formed at an upper inner surface and/or a lower inner surface of a one-unit member, and the upper and lower contact regions of the outer edge of the battery case are sealed by thermal bonding.

The plate-shaped battery cell may be configured to have a structure in which a positive electrode lead and a negative electrode lead protrude from one side of the outer edge thereof or a structure in which the positive electrode lead protrudes from one side of the outer edge of thereof and the negative electrode lead protrudes from the other side of the outer edge thereof.

The electrode leads of the battery cells are coupled to each other using various methods, including welding, to form the coupled portion of the electrode leads. For example, the electrode leads of the battery cells may be coupled to each other by ultrasonic welding. However, the present invention is not limited thereto.

The coupled portion of the electrode leads is configured to have a structure in which electrode leads of two or three of the battery cells constituting the battery cell stack that are adjacent to each other in the vertical direction are coupled to each other such that the electrode leads are connected in series or in parallel to each other. Alternatively, electrode leads of four or more battery cells may be coupled to each other as needed.

In a concrete example, the battery cells may include a first battery cell and a second battery cell adjacent to each other in the vertical direction or in the horizontal direction, and each electrode lead of the second battery cell may include a first bent portion bent toward a corresponding electrode lead of the first battery cell such that the first bent portion is adjacent to the corresponding electrode lead of the first battery cell, an inclined portion extending from the first bent portion, and a second bent portion extending from the inclined portion and horizontally bent such that the second bent portion is connected to the corresponding electrode lead of the first battery cell.

That is, each electrode lead of the second battery cell may include a first bent portion, a second bent portion, and an inclined portion formed between the first bent portion and the second bent portion such that each electrode lead of the second battery cell is connected to a corresponding electrode lead of the first battery cell. In this structure, each electrode lead of the second battery cell overlaps with a corresponding electrode lead of the first battery cell in a state in which each electrode lead of the second battery cell is in surface contact with a corresponding electrode lead of the first battery cell. The overlapping portions may be coupled to each other by welding such that the overlapping portions are electrically connected to each other.

At this time, the second bent portion may be located more adjacent to a main body of the battery cell than the first bent portion. In this structure, the first bent portion may have a bent angle of more than 90 degrees such that each electrode lead of the second battery cell is approximately formed, for example, in the shape of z in vertical section. In addition, the second bent portion may have a bent angle of more than 90 degrees such that second bent portion is horizontally bent such that the second bent portion is connected to the corresponding electrode lead of the first battery cell.

In a more concrete example, the battery cells may further include a third battery cell adjacent to the first battery cell in a state of being opposite to the second battery cell on the basis of the first battery cell, and each electrode lead of the third battery cell may include a first bent portion bent toward a corresponding electrode lead of the first battery cell such that the first bent portion is adjacent to the corresponding electrode lead of the first battery cell, an inclined portion extending from the first bent portion, and a second bent portion extending from the inclined portion and horizontally bent such that the second bent portion is connected to the corresponding electrode lead of the first battery cell.

That is, the electrode leads of the second and third battery cells are connected to the electrode lead of the first battery cell in a state in which the electrode leads of the second and third battery cells each have the first bent portion and the second bent portion, and the connected portions may be electrically and physically coupled to each other by welding.

Meanwhile, the inclined portion may be provided with beads for improving rigidity of the electrode lead. For example, the beads may be protrusions or grooves extending toward the first bent portion and the second bent portion. A plurality of beads may be arranged on the inclined portion at regular intervals. The beads prevent the electrode lead from being deformed due to external force or vibration.

In a concrete example, the damping structure may be a concavo-convex structure formed by bending the coupled portion of the electrode leads.

The concavo-convex structure is not particularly restricted so long as the concavo-convex structure is capable of absorbing external impact or vibration. For example, the concavo-convex structure may be formed to have a dome shape, a triangular shape, or a quadrangular shape in vertical section of the coupled portion of the electrode leads. The concavo-convex structure absorbs external force or vibration applied to the electrode leads in a direction opposite to the direction in which the electrode leads protrude in order to prevent damage to coupled portions between the electrode tabs and the electrode leads.

If the length and the height of the concavo-convex structure are too small, the concavo-convex structure may not properly function. On the other hand, if the length and the height of the concavo-convex structure are too large, the battery module may not have a compact structure due to the increase in volume when the electrode leads are welded to the electrode tabs or to an external device.

For example, the concavo-convex structure may have a size equivalent to 10 to 50% the length of the coupled portion of the electrode leads.

In addition, the concavo-convex structure may have a maximum height equivalent to 30 to 300% the thickness of the coupled portion of the electrode leads.

In a concrete example, the damping structure may be one or more through holes vertically formed through the coupled portion of the electrode leads.

Specifically, the coupled portion of the electrode leads may be configured to have a structure which the electrode leads are coupled to each other by ultrasonic welding, and the through holes may be located between welded portions formed by ultrasonic welding and battery cell cases in order to disperse vibration generated by ultrasonic welding.

Ultrasonic welding may be performed on two or more positions of the coupled portion of the electrode leads, in a state in which the electrode leads overlap with one another, to form the welded portions, and the through holes may be formed so as to correspond to the welded portions such that vibration generated during ultrasonic welding is dispersed by the through holes.

Specifically, ultrasonic welding may be performed such that the welded portions are arranged in a direction perpendicular to the direction in which the electrode leads protrude, and the through holes may be located between the welded portions and battery cells. Consequently, the number of the welded portions may be equal to the number of the through holes.

Meanwhile, in the above-described structure, the concavo-convex structure or the through holes are formed at the coupled portion of the electrode leads to absorb external impact or vibration, thereby improving the safety of the battery module. However, the damping structure is not limited to the above-described examples. In another example, the electrode leads may be provided with beads for improving rigidity of the electrode leads such that external impact or vibration is prevented from being transferred to the coupled portions between the electrode tabs and the electrode leads.

The battery cells are not particularly restricted so long as the battery cells provide high voltage and high current when a battery module or a battery pack is constituted by the battery cells. For example, each of the battery cells may be a lithium secondary battery having a large energy storage quantity per volume.

In accordance with another aspect of the present invention, there is provided a battery pack including the battery module with the above-stated construction as a unit module.

The battery pack may be manufactured by combining the secondary batteries as unit modules based on desired output and capacity. In addition, the battery pack according to the present invention may be used as a power source for an electric vehicle, a hybrid electric vehicle, a plug-in hybrid electric vehicle, or a power storage apparatus in consideration of installation efficiency and structural stability. However, an applicable range of the battery pack according to the present invention is not limited thereto.

In accordance with a further aspect of the present invention, there is provided a device including the battery pack with the above-stated construction as a power source. Specifically, the device may be an electric vehicle, a hybrid electric vehicle, a plug-in hybrid electric vehicle, or a power storage apparatus.

The structure and manufacturing method of the device are well known in the art to which the present invention pertains and, therefore, a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which:

FIG. 1 is a perspective view showing a pouch-shaped battery cell, which is included in a conventional battery module;

FIG. 2 is an exploded perspective view of FIG. 1;

FIG. 3 is a typical view showing a structure in which pouch-shaped battery cells are electrically connected to one another;

FIG. 4 is a perspective view showing one side of a battery module in which a damping structure according to an embodiment of the present invention is formed at electrode leads;

FIG. 5 is a typical view showing a coupled portion of the electrode leads of FIG. 4;

FIG. 6 is a typical view showing a structure in which beads are formed at inclined portions of the electrode leads of FIGS. 4 and 5;

FIG. 7 is a typical view showing a coupled portion of electrode leads at which a damping structure according to another embodiment of the present invention is formed;

FIG. 8 is a typical view showing a coupled portion of electrode leads at which a damping structure according to another embodiment of the present invention is formed; and FIG. 9 is a typical view showing a coupled portion of electrode leads at which a damping structure according to a further embodiment of the present invention is formed.

BEST MODE

Now, exemplary embodiments of the present invention will be described in detail with reference to the accompanying drawings. It should be noted, however, that the scope of the present invention is not limited by the illustrated embodiments.

FIG. 4 is a perspective view showing one side of a battery module in which a damping structure according to an embodiment of the present invention is formed at electrode leads, and FIG. 5 is a typical view showing a coupled portion of the electrode leads of FIG. 4.

Referring to FIGS. 4 and 5, a battery module 100 is configured to have a structure in which battery cells 110a, 110b, and 110c are stacked in a vertical direction while being adjacent to one another, and cartridges 130, functioning as sheathing members, fix the respective battery cells 110a, 110b, and 110c to form a battery cell stack.

Each of the battery cells 110a, 110b, and 110c is configured to have a rectangular plate-shaped structure in which a positive electrode lead 112 and a negative electrode lead 113 protrude from one side of the outer edge thereof as shown in FIG. 1.

Electrode leads 112a, 112b, and 112c of the battery cells 110a, 110b, and 110c, which are stacked vertically, are coupled to one another such that the three battery cells 110a, 110b, and 110c constitute a unit. The electrode leads are coupled to one another by ultrasonic welding. The electrode lead 112a of the battery cell 110a, which is the upper one of the three battery cells 110a, 110b, and 110c, the electrode leads 112a, 112b, and 112c of which are coupled to one another, and the electrode lead 112c of the battery cell 110c, which is the lower one of the three battery cells 110a, 110b, and 110c, the electrode leads 112a, 112b, and 112c of which are coupled to one another, are bent such that the electrode lead 112a of the battery cell 110a and the electrode lead 112c of the battery cell 110c are connected and coupled to the electrode lead 112b of the battery cell 110b, which is located between the battery cell 110a and the battery cell 110c.

Specifically, on the assumption that the upper battery cell 110a is a second battery cell 110a, the lower battery cell 110c is a third battery cell 110c, and, the battery cell 110b located between the second and third battery cells 110a and 110c is a first battery cell 110b, the electrode leads 112a and 112c of the second and third battery cells 110a and 110c respectively include first bent portions 114a and 114c bent toward the electrode lead 112b of the first battery cell 110b such that the first bent portions 114a and 114c are adjacent to the electrode lead 112b of the first battery cell 110b, inclined portions 116a and 116c extending from the first bent portions 114a and 114c, and second bent portions 118a and 118c extending from the inclined portions 116a and 116c and horizontally bent such that the second bent portions 118a and 118c are connected to the electrode lead 112b of the first battery cell 110b.

As a result, the electrode leads 112a and 112c of the second and third battery cells 110a and 110c overlap with the electrode lead 112b of the first battery cell 110b in a state in which the electrode leads 112a and 112c of the second and third battery cells 110a and 110c are in surface contact with the electrode lead 112b of the first battery cell 110b. The overlapping portions are coupled to each other by welding such that the overlapping portions are electrically connected to each other.

In this structure, when external force or vibration is applied to the electrode leads 112a, 112b, and 112c in a direction opposite to the direction in which the electrode leads 112a, 112b, and 112c protrude, the bent structure, including the first bent portions 114a and 114c and the second bent portions 118a and 118c, functions as a damper for absorbing or buffing the external force or the vibration to prevent damage to coupled portions between electrode tabs and the electrode leads of the battery cells 110a, 110b, and 110c.

FIG. 6 is a typical view showing a structure in which beads are formed at the inclined portions of the electrode leads of FIGS. 4 and 5.

Referring to FIG. 6 together with FIG. 5, the inclined portions 116a and 116c of the electrode leads 112a and 112c of the second and third battery cells 110a and 110c are provided with beads 132 for preventing the electrode leads 112a and 112c from being deformed due to external force or vibration and improving rigidity of the electrode leads 112a and 112c. A plurality of beads 132 is arranged on each of the inclined portions 116a and 116c at regular intervals.

FIG. 7 is a typical view showing a coupled portion of electrode leads at which a damping structure according to another embodiment of the present invention is formed.

The coupled portion of the electrode leads shown in FIG. 7 is different from the coupled portion of the electrode leads shown in FIG. 6 in that first bent portions 214a and 214c and second bent portions 218a and 218c have different bent angles than the first bent portions 114a and 114c and the second bent portions 118a and 118c. Specifically, electrode leads 212a and 212c of second and third battery cells 210a and 210c are bent toward an electrode lead 212b of a first battery cell 210b to form first bent portions 214a and 214c, respectively. The first bent portions 214a and 214c have a bent angle $\theta_1$ of more than 90 degrees. As a result, the second bent portions 218a and 218c also have a bent angle of more than 90 degrees such that the second bent portions 218a and 218c are horizontally bent in order for the second bent portions 218a and 218c to be connected to the electrode lead 212b of the first battery cell 210b.

In this structure, the electrode leads 212a and 212c of the second and third battery cells 210a and 210c are configured such that the second bent portions 218a and 218c are located more adjacent to main bodies of the battery cells than the first bent portions 214a and 214c.

That is, when external force or vibration is applied to the electrode leads in a direction opposite to the direction in which the electrode leads protrude, the bent structure, including the first bent portions 214a and 214c and the second bent portions 218a and 218c, more effectively functions as a damper for absorbing or buffing the external force or the vibration to prevent damage to coupled portions between electrode tabs and the electrode leads of the battery cells 210a, 210b, and 210c.

FIG. 8 is a typical view showing a coupled portion of electrode leads at which a damping structure according to another embodiment of the present invention is formed.

Referring to FIG. 8, electrode leads 312a, 312b, and 312c protruding from first to third battery cells 310a, 310b, and 310c are coupled to one another by welding in a state of being stacked to form a coupled portion of the electrode leads. A concavoconvex structure 315 is formed at the coupled portion of the electrode leads.

The concavo-convex structure 315 buffers or absorbs external force or vibration applied to the electrode leads 312a, 312b, and 312c in a direction opposite to the direction in which the electrode leads 312a, 312b, and 312c protrude. In particular, the concavo-convex structure 315 effectively absorbs vibration generated during ultrasonic welding performed to couple the electrode leads 312a, 312b, and 312c to one another. In FIG. 7, only one concavoconvex structure 315 is shown as protruding upward. Alternatively, a plurality of concavo-convex structures 315, for example two or more concavo-convex structures 315, may be provided as needed. In addition, the concavo-convex structure 315 may be formed to have various shapes. For example, the concavo-convex structure 315 may be formed to have a semicircular shape, a triangular shape, or a quadrangular shape.

FIG. 9 is a typical view showing a coupled portion of electrode leads at which a damping structure according to a further embodiment of the present invention is formed.

Referring to FIG. 9, through holes 415 are vertically formed through a coupled portion 411 of electrode leads 412 coupled to one another in a state of being stacked in a vertical direction. The electrode leads 412 are coupled to one another by ultrasonic welding to form the coupled portion 411 of the electrode leads 412. The through holes 415 are located between welded portions 420 formed by ultrasonic welding and battery cell cases 430 in order to disperse vibration generated during ultrasonic welding. When vibration is transferred from the welded portions 420 toward the battery cell cases 430, therefore, the vibration is dispersed by the through holes 415, thereby preventing the short circuit of, breakage of, or damage to coupled portions between electrode tabs and the electrode leads.

Ultrasonic welding is performed on a plurality of positions of the coupled portion of the electrode leads 412, in a state in which the electrode leads 412 overlap with one another, to form the welded portions 420. The through holes 415 are formed so as to correspond to the welded portions 420. Consequently, vibration generated during ultrasonic welding is dispersed by the through holes 415.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, the battery module according to the present invention is configured such that vibration or external impact applied to electrode leads is absorbed or dispersed by a damping structure, thereby preventing the breakage of, short circuit of, or damage to coupled portions between electrode tabs and the electrode leads and thus improving the safety of the battery module.

The invention claimed is:

1. A battery module comprising:
two or more battery cells, which can be charged and discharged, stacked in a state of being adjacent to each other in a vertical direction or in a horizontal direction; and
sheathing members for respectively fixing the battery cells to form a battery cell stack, wherein
each of the battery cells has electrode leads electrically connected to an electrode assembly, which is mounted in a battery cell case of each of the battery cells, in a state of protruding outward from the battery cell case,
the electrode leads of the battery cells of the battery cell stack are coupled to each other by welding to form a coupled portion of the electrode leads, and
the coupled portion of the electrode leads or the remaining portion of the electrode leads excluding the coupled portion of the electrode leads of a first battery cell and a second battery cell of the two or more battery cells is provided with a damping structure for absorbing or buffering external force applied to the battery module or vibration generated during welding,
the first battery cell and the second battery cell are adjacent to each other in the vertical direction or in the horizontal direction, and each electrode lead of the second battery cell comprises a first bent portion bent toward a corresponding electrode lead of the first battery cell such that the first bent portion is adjacent to the corresponding electrode lead of the first battery cell, an inclined portion extending from the first bent portion at an angle other than perpendicular towards the second battery cell, and a second bent portion extending from the inclined portion and horizontally bent such that the second bent portion is connected to the corresponding electrode lead of the first battery cell, and
the second bent portion being positioned closer to the second battery cell than the first bent portion is positioned to the second battery cell.

2. The battery module according to claim 1, wherein each of the battery cells is a rectangular plate-shaped battery cell.

3. The battery module according to claim 2, wherein the plate-shaped battery cell is configured to have a structure in which an electrode assembly is mounted in a battery case made of a laminate sheet comprising a metal layer and a resin layer, and an outer edge of the battery case is sealed.

4. The battery module according to claim 2, wherein the plate-shaped battery cell is configured to have a structure in which a positive electrode lead and a negative electrode lead protrude from one side of an outer edge thereof or a structure in which the positive electrode lead protrudes from one side of the outer edge of thereof and the negative electrode lead protrudes from the other side of the outer edge thereof.

5. The battery module according to claim 1, wherein the electrode leads of the battery cells are coupled to each other by ultrasonic welding in a state of being stacked to form the coupled portion of the electrode leads.

6. The battery module according to claim 1, wherein the coupled portion of the electrode leads is configured to have a structure in which electrode leads of two or three battery cells adjacent to each other in the vertical direction are coupled to each other.

7. The battery module according to claim 1, wherein the second bent portion is located more adjacent to a main body of the battery cell than the first bent portion.

8. The battery module according to claim 1, wherein the battery cells further comprise a third battery cell adjacent to the first battery cell in a state of being opposite to the second battery cell on the basis of the first battery cell, and each electrode lead of the third battery cell comprises a first bent portion bent toward a corresponding electrode lead of the first battery cell such that the first bent portion is adjacent to the corresponding electrode lead of the first battery cell, an inclined portion extending from the first bent portion, and a second bent portion extending from the inclined portion and horizontally bent such that the second bent portion is connected to the corresponding electrode lead of the first battery cell.

9. A battery module comprising:
two or more battery cells, which can be charged and discharged, stacked in a state of being adjacent to each other in a vertical direction or in a horizontal direction; and
sheathing members for respectively fixing the battery cells to form a battery cell stack, wherein
each of the battery cells has electrode leads electrically connected to an electrode assembly, which is mounted in a battery cell case of each of the battery cells, in a state of protruding outward from the battery cell case,
the electrode leads of the battery cells of the battery cell stack are coupled to each other by welding to form a coupled portion of the electrode leads, and
the coupled portion of the electrode leads or the remaining portion of the electrode leads excluding the coupled portion of the electrode leads is provided with a damping structure for absorbing or buffering external force applied to the battery module or vibration generated during welding,
the battery cells comprise a first battery cell and a second battery cell adjacent to each other in the vertical direction or in the horizontal direction, and each electrode lead of the second battery cell comprises a first bent portion bent toward a corresponding electrode lead of the first battery cell such that the first bent portion is adjacent to the corresponding electrode lead of the first battery cell, an inclined portion extending from the first bent portion at an angle other than perpendicular, and a second bent portion extending from the inclined portion and horizontally bent such that the second bent portion is connected to the corresponding electrode lead of the first battery cell, and
the inclined portion is provided with a plurality of beads, each bead being in the form of raised material from only one surface of the inclined portion for improving rigidity of the electrode lead, and each bead extending from the first bent portion towards the second bent portion.

10. A battery module comprising:
two or more battery cells, which can be charged and discharged, stacked in a state of being adjacent to each other in a vertical direction or in a horizontal direction; and
sheathing members for respectively fixing the battery cells to form a battery cell stack, wherein
each of the battery cells has electrode leads electrically connected to an electrode assembly, which is mounted in a battery cell case of each of the battery cells, in a state of protruding outward from the battery cell case,
the electrode leads of the battery cells of the battery cell stack are coupled to each other by welding to form a coupled portion of the electrode leads, and
the coupled portion of the electrode leads or the remaining portion of the electrode leads excluding the coupled portion of the electrode leads is provided with a damping structure for absorbing or buffering external force applied to the battery module or vibration generated during welding,
the battery cells comprise a first battery cell and a second battery cell adjacent to each other in the vertical direction or in the horizontal direction, and each electrode lead of the second battery cell comprises a first bent portion bent toward a corresponding electrode lead of the first battery cell such that the first bent portion is adjacent to the corresponding electrode lead of the first battery cell, an inclined portion extending from the first bent portion at an angle other than perpendicular, and a second bent portion extending from the inclined portion and horizontally bent such that the second bent portion is connected to the corresponding electrode lead of the first battery cell, and
the damping structure is a concavo-convex structure formed by bending the coupled portion of the electrode leads after the coupled portion is formed so as to provide a stacked concavo-convex structure.

11. The battery module according to claim 10, wherein the concavo-convex structure is formed to have a dome shape, a triangular shape, or a quadrangular shape in vertical section of the coupled portion of the electrode leads.

12. The battery module according to claim 10, wherein the concavo-convex structure has a size equivalent to 10 to 50% a length of the coupled portion of the electrode leads.

13. The battery module according to claim 10, wherein the concavo-convex structure has a maximum height equivalent to 30 to 300% a thickness of the coupled portion of the electrode leads.

14. A battery module comprising:
two or more battery cells, which can be charged and discharged, stacked in a state of being adjacent to each other in a vertical direction or in a horizontal direction; and
sheathing members for respectively fixing the battery cells to form a battery cell stack, wherein
each of the battery cells has electrode leads electrically connected to an electrode assembly, which is mounted in a battery cell case of each of the battery cells, in a state of protruding outward from the battery cell case,
the electrode leads of the battery cells of the battery cell stack are coupled to each other by welding to form a coupled portion of the electrode leads, and
the coupled portion of the electrode leads or the remaining portion of the electrode leads excluding the coupled portion of the electrode leads is provided with a damping structure for absorbing or buffering external force applied to the battery module or vibration generated during welding,
the battery cells comprise a first battery cell and a second battery cell adjacent to each other in the vertical direction or in the horizontal direction, and each electrode lead of the second battery cell comprises a first bent portion bent toward a corresponding electrode lead of the first battery cell such that the first bent portion is adjacent to the corresponding electrode lead of the first battery cell, an inclined portion extending from the first bent portion at an angle other than perpendicular, and a second bent portion extending from the inclined portion and horizontally bent such that the second bent portion is connected to the corresponding electrode lead of the first battery cell, and
the damping structure is one or more through holes vertically formed through the coupled portion of the electrode leads at a location where the electrode leads extend in parallel.

15. The battery module according to claim 14, wherein the coupled portion of the electrode leads is configured to have a structure which the electrode leads are coupled to each other by ultrasonic welding, and the through holes are located between welded portions formed by ultrasonic welding and battery cell cases in order to disperse vibration generated by ultrasonic welding.

16. The battery module according to claim 15, wherein two or more welded portions are formed by ultrasonic welding, and the through holes are formed so as to correspond to the welded portions.

17. The battery module according to claim 1, wherein each of the battery cells is a lithium secondary battery.

18. A battery pack comprising a battery module according to claim 1 as a unit module.

19. A device comprising a battery pack according to claim 18.

20. The device according to claim 19, wherein the device is an electric vehicle, a hybrid electric vehicle, a plug-in hybrid electric vehicle, or a power storage apparatus.

\* \* \* \* \*